United States Patent
Kobayashi et al.

(10) Patent No.: US 7,251,371 B2
(45) Date of Patent: Jul. 31, 2007

(54) IMAGE ENCODING METHOD, IMAGE DECODING METHOD, IMAGE ENCODER, IMAGE DECODER, PROGRAM, COMPUTER DATA SIGNAL, AND IMAGE TRANSMISSION SYSTEM

(75) Inventors: Mitsuru Kobayashi, Yokohama (JP); Shunichi Sekiguchi, Yamato (JP); Satoru Adachi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 672 days.

(21) Appl. No.: 10/475,570

(22) Filed: Oct. 22, 2003

(65) Prior Publication Data
US 2004/0131272 A1 Jul. 8, 2004

(30) Foreign Application Priority Data
Nov. 16, 2001 (JP) ............................. 2001-352377

(51) Int. Cl.
*G06K 9/36* (2006.01)
(52) U.S. Cl. ...................................... 382/239
(58) Field of Classification Search ................ 382/232, 382/233, 238, 239, 243–248, 250; 375/240.12, 375/240.18–240.2, 240.23–240.25; 348/394.1–395.1, 348/403.1–404.1, 408.1–409.1, 414.1, 424.2, 348/417.1–418.1, 420.1–422.1; 358/426.04, 358/426.12, 426.13; 341/106, 107
See application file for complete search history.

(56) References Cited

U.S. PATENT DOCUMENTS 6,122,318 A * 9/2000 Yamaguchi et al. ........ 375/240

6,198,768 B1 * 3/2001 Yamaguchi et al. ... 375/240.01
6,259,738 B1 * 7/2001 Yamaguchi et al. ... 375/240.21

FOREIGN PATENT DOCUMENTS

JP 8-186722 7/1996
JP 2000-308054 11/2000

OTHER PUBLICATIONS

VCEG-M10 H.26L Test Model Long Term No. 8 (TML-8) draft0.

* cited by examiner

*Primary Examiner*—Jose L. Couso
(74) *Attorney, Agent, or Firm*—Oblon, Spivak, McClelland, Maier & Neustadt, P.C.

(57) ABSTRACT

An orthogonal transform such as a DCT is carried out for image data D5 of an image in blocks obtained by dividing a frame image, the image data D5 being represented by spatial coordinates (Step S102), and a plurality of orthogonal transform coefficients D6 as image data represented by spatial frequencies are generated. Then, the orthogonal transform coefficients D6 undergo arithmetic coding, and thus coded data D7 is generated (S103). Subsequently, in the arithmetic coding of the orthogonal transform coefficients, data characteristics of the orthogonal transform coefficients to be coded, which depend on the spatial frequencies, are considered, and a probability table is switched for a predetermined orthogonal transform coefficient, and thus the arithmetic coding is carried out. Thus, the image coding method, image decoding method, image coding apparatus, image decoding apparatus, program, computer data signal, and image transmission system, which are capable of enhancing efficiency of data compression in coded data by reflecting characteristics of image data to be coded on coding conditions, are realized.

41 Claims, 17 Drawing Sheets

Fig.1

| CHARACTER | APPEARANCE PROBABILITY | SECTION ON NUMBER LINE |
|---|---|---|
| A | 1/10 | [0.00,0.10) |
| C | 1/10 | [0.10,0.20) |
| E | 1/10 | [0.20,0.30) |
| H | 1/10 | [0.30,0.40) |
| I | 2/10 | [0.40,0.60) |
| M | 1/10 | [0.60,0.70) |
| R | 1/10 | [0.70,0.80) |
| T | 2/10 | [0.80,1.00) |

Fig.3

| CODE WORD | PROBABILITY TABLE | | | OUTPUT |
|---|---|---|---|---|
| | LOWER LIMIT | UPPER LIMIT | SECTION LENGTH | |
| 0.0757451536 | 0.0 | 0.1 | 0.1 | A |
| 0.757451536 | 0.7 | 0.8 | 0.1 | R |
| 0.57451536 | 0.4 | 0.6 | 0.2 | I |
| 0.8725768 | 0.8 | 1.0 | 0.2 | T |
| 0.362884 | 0.3 | 0.4 | 0.1 | H |
| 0.62884 | 0.6 | 0.7 | 0.1 | M |
| 0.2884 | 0.2 | 0.3 | 0.1 | E |
| 0.884 | 0.8 | 1.0 | 0.2 | T |
| 0.42 | 0.4 | 0.6 | 0.2 | I |
| 0.1 | 0.1 | 0.2 | 0.1 | C | mode0
Skip mode1
Inter
16 × 16 mode2
Inter
16 × 8 mode3
Inter
8 × 16 mode4
Inter
8 × 8 mode5
Inter
8 × 4 mode6
Inter
4 × 8 mode7
Inter
4 × 4 mode8
Intra
4 × 4 mode9
Intra
16 × 16

Fig.8A

HORIZONTAL COORDINATES →

VERTICAL COORDINATES ↓

| $a_{11}$ | $a_{12}$ | $a_{13}$ | $a_{14}$ |
|---|---|---|---|
| $a_{21}$ | $a_{22}$ | $a_{23}$ | $a_{24}$ |
| $a_{31}$ | $a_{32}$ | $a_{33}$ | $a_{34}$ |
| $a_{41}$ | $a_{42}$ | $a_{43}$ | $a_{44}$ |

Fig.8B

HORIZONTAL FREQUENCIES →

VERTICAL FREQUENCIES ↓

| $f_{11}$ | $f_{12}$ | $f_{13}$ | $f_{14}$ |
|---|---|---|---|
| $f_{21}$ | $f_{22}$ | $f_{23}$ | $f_{24}$ |
| $f_{31}$ | $f_{32}$ | $f_{33}$ | $f_{34}$ |
| $f_{41}$ | $f_{42}$ | $f_{43}$ | $f_{44}$ |

HORIZONTAL FREQUENCIES →

VERTICAL FREQUENCIES ↓

| 10 | 0 | -1 | 0 |
|---|---|---|---|
| 2 | 0 | 0 | 0 |
| 0 | 1 | 0 | 0 |
| 0 | 0 | 0 | 0 |

| $f_{11}$ | $f_{12}$ | $f_{21}$ | $f_{31}$ | $f_{22}$ | $f_{13}$ | $f_{14}$ | $f_{23}$ | $f_{32}$ | $f_{41}$ | $f_{42}$ | $f_{33}$ | ..... |
|---|---|---|---|---|---|---|---|---|---|---|---|---|
| 10 | 0 | 2 | 0 | 0 | -1 | 0 | 0 | 1 | 0 | 0 | 0 | ..... |

$S_1$ $S_2$ $S_3$ $S_4$ $S_5$

| COEFFICIENT GROUP | LEVEL | RUN |
|---|---|---|
| $S_1$ | 10 | 0 |
| $S_2$ | 2 | 1 |
| $S_3$ | -1 | 2 |
| $S_4$ | 1 | 2 |
| $S_5$ | 0 | — |

Fig.12

| LEVEL | BINARIZATION PATTERN | | | | | | | |
|---|---|---|---|---|---|---|---|---|
| 0 | 1 | | | | | | | |
| 1 | 0 | 1 | | | | | | |
| 2 | 0 | 0 | 1 | | | | | |
| 3 | 0 | 0 | 0 | 1 | | | | |
| 4 | 0 | 0 | 0 | 0 | 1 | | | |
| 5 | 0 | 0 | 0 | 0 | 0 | 1 | | |
| 6 | 0 | 0 | 0 | 0 | 0 | 0 | 1 | |
| ⋮ | | | | | | | | |
| Bin_no. | 1 | 2 | 3 | 4 | 5 | 6 | 7 | ... |

*Fig.15*

| A+B | | FREQUENCY OF C=0 | FREQUENCY OF C≠0 | PROBABILITY OF C=0 |
|---|---|---|---|---|
| Intra | A+B=0 | 4762 | 4534 | 0.512 |
| Intra | A+B=1 | 13302 | 29182 | 0.313 |
| Intra | A+B=2 | 2620 | 17020 | 0.133 |
| Inter | A+B=0 | 13830 | 8768 | 0.612 |
| Inter | A+B=1 | 71666 | 61863 | 0.537 |
| Inter | A+B=2 | 36660 | 64052 | 0.364 |

*Fig.16*

|  | Foreman QP=24 | Foreman QP=16 | Stefan QP=24 | Stefan QP=16 |
|---|---|---|---|---|
| CONVENTIONAL | 71839 | 316705 | 365096 | 1420955 |
| PRESENT INVENTION | 70165 | 313445 | 362384 | 1414897 |
| DECREASE RATIO | -2.33% | -1.03% | -0.74% | -0.43% |

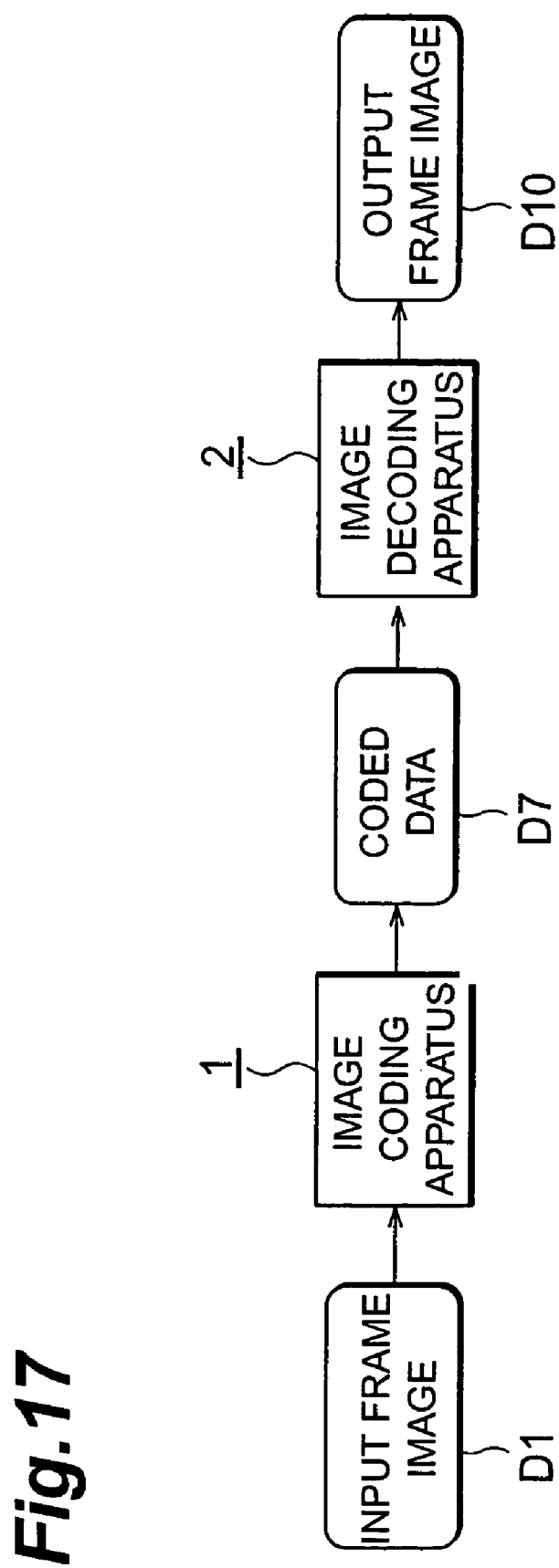

IMAGE ENCODING METHOD, IMAGE DECODING METHOD, IMAGE ENCODER, IMAGE DECODER, PROGRAM, COMPUTER DATA SIGNAL, AND IMAGE TRANSMISSION SYSTEM

TECHNICAL FIELD

The present invention relates to an image coding method, an image decoding method, an image coding apparatus, an image decoding apparatus, a program, and a computer data signal which can be suitably applied to an image transmission system such as a mobile video transmission system, and relates to the image transmission system.

BACKGROUND ART

Heretofore, a standard coding system for a moving picture, such as ITU-T H.26x and MPEG series, has been known as a coding system for a moving picture. In such an image coding system, image data (spatial image data) represented by spatial coordinates undergoes an orthogonal transform and is transformed into image data (frequency image data) represented by spatial frequencies. The orthogonal transform as described above makes it possible to remove a redundancy as to a spatial change from a frame image serving as an object to be coded, and efficiency of data compression by an image coding and the like are enhanced.

As an orthogonal transform applied to image data, DCT (discrete cosine transform) is mainly used from a viewpoint of a balance between the compression efficiency and a package load, popularization of an exclusive LSI and the like. The DCT is carried out for the spatial image data, and thus a plurality of DCT coefficients are generated as orthogonal transform coefficients, which are frequency image components in the frequency image data.

Moreover, the orthogonal transform coefficients generated by the orthogonal transform such as the DCT further undergo variable-length coding, and become coded data as compressed data for use in image transmission. As one of such variable-length coding methods, arithmetic coding (AC) is used.

In general, in the case of carrying out the arithmetic coding of an information source string (symbol string) formed by combining plural types of symbols, first, certain sections are allocated to the respective symbols in accordance with the appearance probabilities of the symbols on a number line (probability number line) of [0.0, 1.0). In this case, one representing correspondence relationships between the symbols and the sections on the number line is called a probability table. When the information source string undergoes the variable-length coding by the arithmetic coding, code words expressing the information source string on the number line is generated by referring to this probability table.

Here, the arithmetic coding will be described with reference to FIGS. 1 to 3. Specifically, a character string "ARITHMETIC" will be cited as the information source string to be coded, and the arithmetic coding thereof will be exemplified.

Eight types of characters (symbols), which are A, C, E, H, I, M, R and T, appear in the above-described information source string. As shown in the table of FIG. 1, sections are allocated to these characters on the number line (probability number line) of [0.0, 1.0) such that section lengths proportional to the appearance probabilities of the respective characters in the character string can be obtained. The table shown in FIG. 1, which represents these correspondence relationships between the characters and the sections on the number line, becomes a probability table for use in the arithmetic coding.

FIG. 2 is a diagram illustrating the coding of the character string "ARITHMETIC" by use of the probability table shown in FIG. 1. In the arithmetic coding, a section reduction operation based on the probability table is sequentially carried out for the respective symbols included in the information source string, thus generating code words formed by coding the information source string.

In the example shown in FIG. 2, first, the probability table shown in FIG. 1 is referred to for the first character "A" of the character string "ARITHMETIC" to be coded, and the section [0, 1) on the number line is divided into eight sections corresponding to the respective characters. Then, the section is reduced to the section [0.0, 0.1) corresponding to the character "A" among the eight sections. Next, the probability table is referred to for the second character "R", and the section [0.0, 0.1) is divided into eight sections. Subsequently, among these sections, the section is reduced to the section [0.07, 0.08) corresponding to the character "R".

Hereinafter, the coding operations by the section reduction are carried out sequentially for each of the characters. Then, in the section [0.0757451536, 0.0757451552) on the number line finally obtained, a numerical value "0.0757451536" within the section is generated as a code word obtained by performing the arithmetic coding of the character string "ARITHMETIC".

FIG. 3 is a table showing decoding of the code word "0.0757451536" obtained by use of the probability table shown in FIG. 1 to the character string "ARITHMETIC".

In the example shown in FIG. 3, the probability table shown in FIG. 1 is referred to for the code word "0.0757451536" to be decoded, and the section [0.0, 0.1) having a section length of 0.1 in which the code word is included is specified. Then, the character "A" corresponding to the specified section is outputted as the first character, and a new code word "0.757451536" is generated by (code word—lower limit)/(section length). Next, the probability table is referred to for the code word "0.757451536", and a section [0.7, 0.8) having a section length of 0.1 in which the code word is included is specified. Then, the character "R" corresponding to the specified section is outputted as the second character, and a new code word "0.57451536" is generated.

Hereinafter, the decoding operations are sequentially carried out for the code words. Then, the character string "ARITHMETIC" is restored from the code word "0.0757451536" which underwent the arithmetic coding.

As described above, in the variable-length coding of the information source string by use of the arithmetic coding, the symbols included in the information source string and the sections on the number line are allowed to correspond to each other, thus making it possible to express an arbitrary information source string by the code words on the number line of [0.0, 1.0). Moreover, the probability table allowing the symbols and the sections to correspond to each other is set in accordance with the appearance probabilities of the respective symbols, whereby the variable-length coding of the information source string can be performed effectively and the efficiency of data compression by the coding can be enhanced.

DISCLOSURE OF INVENTION

FIG. 4 is a flowchart illustrating an example of an image coding method using the variable-length coding by the foregoing arithmetic coding. In the image coding method shown in FIG. 4, arithmetic coding of image data is carried out by a method called CABAC (Context-based Adaptive Binary Arithmetic Coding) using context modeling which is used in ITU-T H.26L video coding system (refer to VCEG-M10 H.26L Test Model Long Term Number 8 (TML-8) draft0).

In the coding of the image data, an image to be coded is first divided into blocks having a predetermined size, and intra-frame coding, inter-frame coding, and necessary data transform processing such as an orthogonal transform including the DCT are carried out for each of the blocks. Then, image data expressing an image in each block is generated. Subsequently, the variable-length coding is carried out for the image data by use of the arithmetic coding or the like, and coded data subjected to data compression is generated.

Particularly, in the image coding method shown in FIG. 4, the coding is not carried out under conditions that are set fixedly in advance, but the context modeling is carried out when the image data for each block is coded (Step S901, Context Modeling). In the arithmetic coding using the context modeling, with regard to the probability table for use in the coding of the image data, a probability table to be applied to the image data in the block to be coded is set so as to be switched with reference to coding conditions such as processing results of image coding in blocks adjacent thereto.

When the setting of the probability table by the context modeling is terminated, the image data to be coded (for example, a plurality of DCT coefficients) is binarized, and a data string to be transmitted is generated (S902, Binarization). Then, the arithmetic coding is carried out for the binarized data string (S903, Adaptive Binary Arithmetic Coding), and the coded data is obtained.

Specifically, the probability table set by the context modeling is allocated to each bit of the binarized data string, and probability estimation is carried out (S904, Probability Estimation). Then, the data string undergoes the arithmetic coding by use of the allocated probability tables, and the code words on the number line, which are the coded data, are generated (S905, Arithmetic Coding). Moreover, information such as occurrence frequencies of the coded bits is feedbacked to the probability table based on processing results of the arithmetic coding, and thus the probability estimation is updated, and the coding trend is reflected on the probability table (S906, Probability Estimation Update).

According to the foregoing image coding method by the arithmetic coding using the context modeling, the probability table to be used is switched in accordance with the coding conditions and the processing results, thus making it possible to decrease the redundancy in the coded data. However, characteristics owned by the data itself to be coded are not directly reflected on the coding conditions in the arithmetic coding even if the context modeling as described above is carried out. Therefore, the conventional coding method has had a problem that, in the coded data, the efficiency of the data compression by removing the redundancy of the image data is not sufficiently enhanced.

The present invention was made in order to solve the foregoing problem. It is an object of the present invention to provide an image coding method, an image decoding method, an image coding apparatus, an image decoding apparatus, a program, a computer data signal, and an image transmission system, which are capable of enhancing the efficiency of the data compression in the coded data by reflecting the characteristics of the image data to be coded on the coding conditions.

In order to attain the object as described above, the image coding method according to the present invention is a coding method, in which an image is divided into blocks of a predetermined size and image data is coded for each of the blocks, the method comprising: (1) an orthogonal transform step of performing an orthogonal transform for image data of an image in the blocks, the image data being represented by spatial coordinates, to generate a plurality of orthogonal transform coefficients; and (2) a coding step of performing variable-length coding for the plurality of orthogonal transform coefficients by arithmetic coding using predetermined probability tables to generate coded data, (3) wherein, in the coding step, the probability table to be applied to a predetermined orthogonal transform coefficient among the plurality of orthogonal transform coefficients is switched in accordance with a value of a spatial frequency therein.

Similarly, the image coding apparatus according to the present invention is a coding apparatus, in which an image is divided into blocks of a predetermined size and image data is coded for each of the blocks, the apparatus comprising: (1) orthogonal transform means for performing an orthogonal transform for image data of an image in the blocks, the image data being represented by spatial coordinates to generate a plurality of orthogonal transform coefficients; and (2) coding means for performing variable-length coding for the plurality of orthogonal transform coefficients by arithmetic coding using a predetermined probability table to generate coded data, (3) wherein the coding means switches the probability table to be applied to a predetermined orthogonal transform coefficient among the plurality of orthogonal transform coefficients in accordance with a value of a spatial frequency therein.

Similarly, the image coding program according to the present invention is a program for causing a computer to execute the above-mentioned image coding method. Further, the computer data signal according to the present invention is a data signal embodied in carrier wave for carrying an image coding program for causing a computer to execute the above-mentioned image coding method.

In the foregoing image coding method, apparatus, program, and computer data signal, the spatial image data is orthogonally transformed into orthogonal transform coefficients as frequency image data, then the orthogonal transform coefficients undergo the arithmetic coding, and thus the coded data subjected to data compression is generated. Then, in the arithmetic coding of the orthogonal transform coefficients, data characteristics of the orthogonal transform coefficients to be coded, which depend on the spatial frequency, are considered, and the probability table is switched for one or a plurality of the orthogonal transform coefficients separately from those for other orthogonal transform coefficients, and thus the arithmetic coding is performed.

Thus, the data characteristics owned by the orthogonal transform coefficients themselves as the image data are reflected on coding conditions in the arithmetic coding. Accordingly, the redundancy of the image data is removed effectively, thus making it possible to enhance the efficiency of the data compression in the coded data.

Moreover, the image decoding method according to the present invention is a decoding method, in which an image is divided into blocks of a predetermined size and coded data obtained by coding image data for each of the blocks is decoded, the method comprising: (1) a decoding step of performing variable-length decoding for the coded data by inverse arithmetic coding using a predetermined probability table to generate a plurality of orthogonal transform coefficients; and (2) an inverse orthogonal transform step of performing an inverse orthogonal transform for the plurality of orthogonal transform coefficients to generate image data represented by spatial coordinates of the image in the blocks, (3) wherein, in the decoding step, the probability table to be applied to a predetermined orthogonal transform coefficient among the plurality of orthogonal transform coefficients is switched in accordance with a value of a spatial frequency therein.

Similarly, the image decoding apparatus according to the present invention is a decoding apparatus, in which an image is divided into blocks of a predetermined size and coded data obtained by coding image data for each of the blocks is decoded, the apparatus comprising: (1) decoding means for performing variable-length decoding for the coded data by inverse arithmetic coding using a predetermined probability table to generate a plurality of orthogonal transform coefficients; and (2) inverse orthogonal transform means for performing an inverse orthogonal transform for the plurality of orthogonal transform coefficients to generate image data represented by spatial coordinates of the image in the blocks, (3) wherein the decoding means switches the probability table to be applied to a predetermined orthogonal transform coefficient among the plurality of orthogonal transform coefficients in accordance with a value of a spatial frequency therein.

Similarly, the image decoding program according to the present invention is a program for causing a computer to execute the above-mentioned image decoding method. Further, the computer data signal according to the present invention is a data signal embodied in carrier wave for carrying an image decoding program for causing a computer to execute the above-mentioned image decoding method.

In the foregoing image decoding method, apparatus, program, and computer data signal, the coded data subjected to the data compression undergoes the inverse arithmetic coding to decode the orthogonal transform coefficients as frequency image data, then the orthogonal transform coefficients undergo the inverse orthogonal transform, and thus the spatial image data is generated. Then, in the inverse arithmetic coding of the coded data, similarly to the foregoing case of the arithmetic coding, data characteristics of the orthogonal transform coefficients to be decoded, which depend on the spatial frequency, are considered, and the probability table is switched for one or a plurality of the orthogonal transform coefficients separately from those for other orthogonal transform coefficients, and thus the inverse arithmetic coding is performed.

Thus, the data characteristics owned by the orthogonal transform coefficients themselves as the image data are reflected on decoding conditions in the inverse arithmetic coding. Accordingly, it is made possible to suitably restore the image data from the coded data from which the redundancy of the image data is removed effectively to enhance the efficiency of the data compression.

Moreover, the image transmission system according to the present invention is an image transmission system, in which an image is divided into blocks of a predetermined size, and the image is transmitted by coded data obtained by coding image data for each of the blocks, the system comprising: (1) the foregoing image coding apparatus of generating coded data from an image and outputting the same; and (2) the foregoing image decoding apparatus of receiving the coded data from the image coding apparatus and restoring the image.

According to the image transmission system as described above, the image can be transmitted efficiently by use of the coded data in which the characteristics of the image data to be coded are reflected on the coding conditions to result in the enhancement of the efficiency of the data compression.

BRIEF DESCRIPTION OF DRAWINGS

FIG. 1 is a table showing an example of the probability table for use in the arithmetic coding.

FIG. 3 is a table showing decoding of the character string by use of the probability table shown in FIG. 1.

FIGS. 8A and 8B are diagrams illustrating an orthogonal transform of image data.

FIG. 12 is a table showing an example of a binarization table for use in binarization of Level data.

FIG. 15 is a table showing correlations between existences of DCT coefficients that are not 0 in the blocks A and B adjacent to the block C and probabilities that the DCT coefficients in the block C are 0.

FIG. 16 is a table showing effects of decreasing code amounts by the switching of the probability table for the DCT coefficients.

FIG. 17 is a schematic diagram illustrating a constitution of one embodiment of an image transmission system.

BEST MODE FOR CARRYING OUT THE INVENTION

Figure 2:
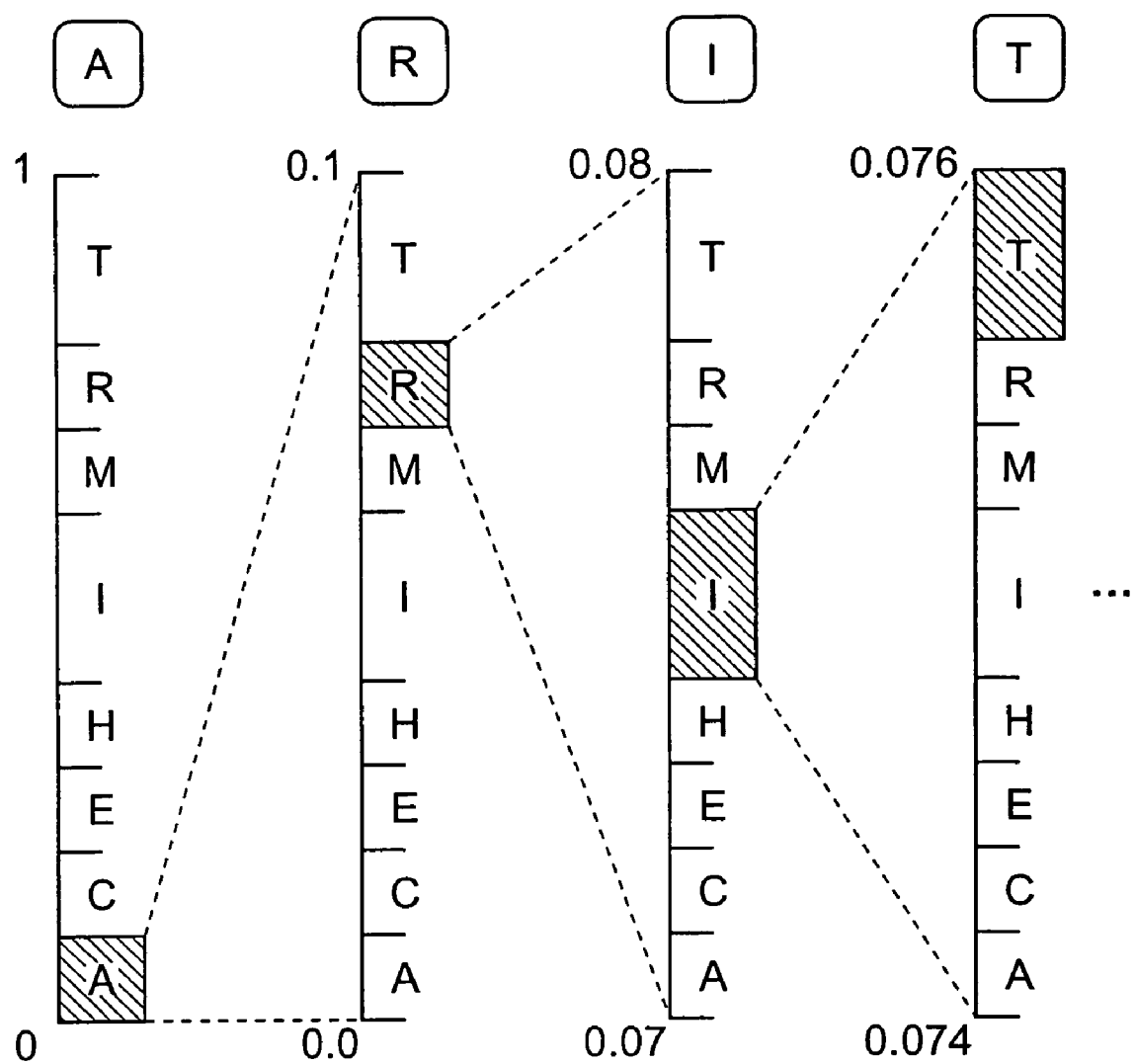
FIG. 2 is a diagram illustrating coding of a character string by use of the probability table shown in FIG. 1.

Description will be made below in detail with reference to the drawings for preferred embodiments of an image coding method, an image decoding method, an image coding apparatus, an image decoding apparatus, a program, a computer data signal, and an image transmission system using these methods and apparatuses, all of which are according to the present invention. Note that, in descriptions of the drawings, the same reference numerals will be added to the same elements, and repeated explanations will be omitted. Moreover, dimension ratios of the drawings do not always coincide with those in the descriptions thereof.

First, the image coding method and the image coding apparatus will be described.

Figure 5:
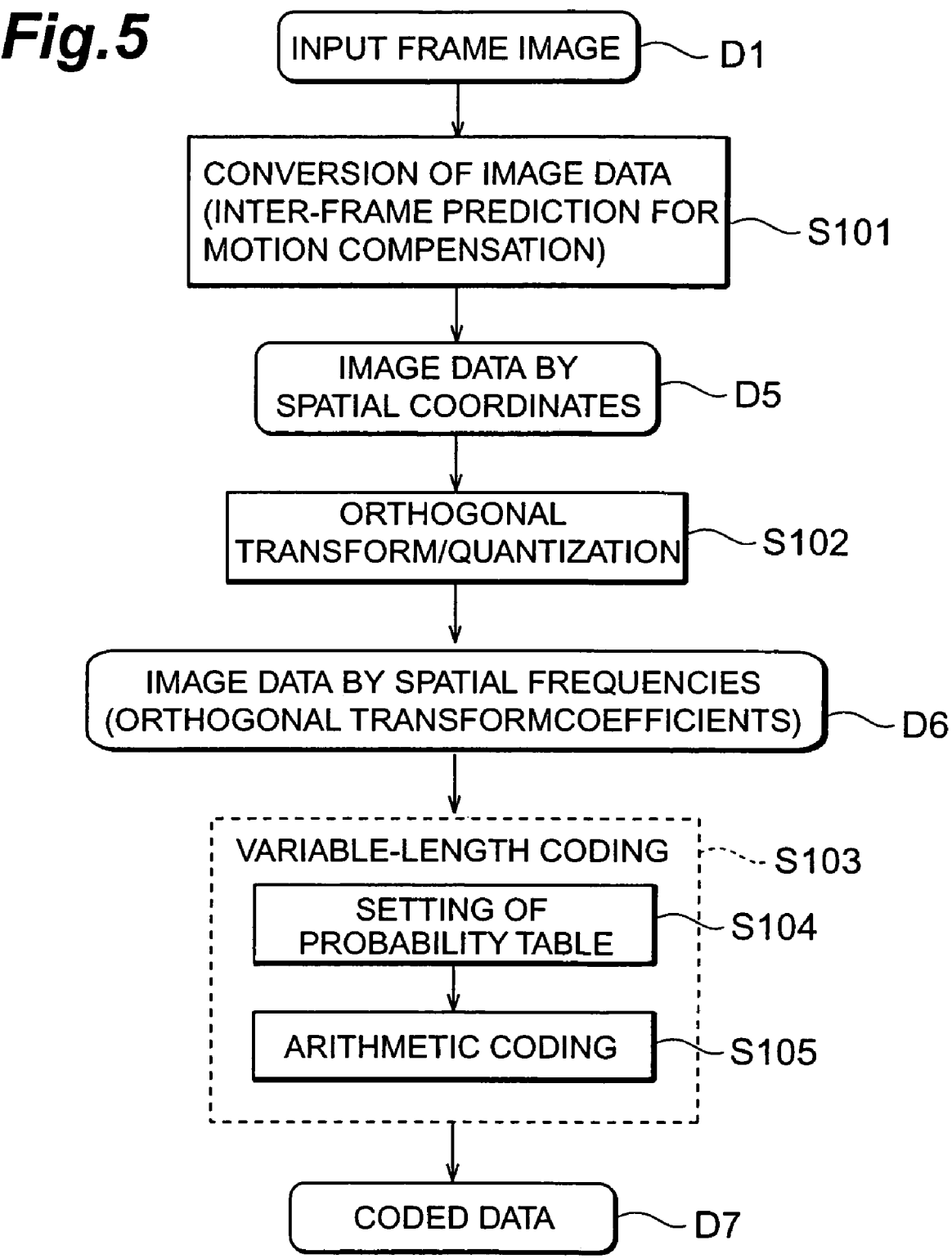
FIG. 5 is a flowchart schematically showing one embodiment of an image coding method.

FIG. 5 is a flowchart schematically showing one embodiment of the image coding method according to the present invention. This coding method is an image coding method, in which predetermined transform and coding processing operations are carried out for an input frame image D1 as a frame image in a static image or a moving picture, and coded data D7 subjected to data compression is generated, the coded data D7 being transmittable in the image transmission system such as a mobile video transmission system.

In the image coding method shown in FIG. 5, a predetermined data processing operation is first carried out for the input frame image D1, and image data thereof is transformed into image data (spatial image data) D5 represented by spatial coordinates (Step S101). As the data processing operation carried out here, for example, there is a motion compensation (MC) inter-frame prediction in the case of carrying out inter-frame coding for a frame image in the moving picture. Moreover, in the case of carrying out intra-frame coding for the frame image, for example, the image data of the input frame image D1 becomes the spatial image data D5 as it is.

Next, an orthogonal transform operation is carried out for the spatial image data D5, and image data (frequency image data) D6 represented by spatial frequencies is generated (S102, orthogonal transform step). This orthogonal transform is carried out for spatial image data of an image for each block obtained by dividing the frame image by a predetermined size (predetermined number of pixels). Thus, the frequency image data D6 is obtained for each block included in the input frame image D1.

The frequency image data D6 obtained by the orthogonal transform is composed of a plurality of orthogonal transform coefficients. The orthogonal transform coefficients represent frequency image components at a predetermined spatial frequency in the image within the block, respectively. Moreover, a quantization operation is further carried out for these orthogonal transform coefficients according to needs, and orthogonal transform coefficients (quantization coefficients) to be coded are generated.

Subsequently, variable-length coding is carried out for the plurality of orthogonal transform coefficients D6 by use of the arithmetic coding, and the coded data D7 as compressed data is generated (S103, coding step). Specifically, a predetermined probability table is set as, the probability table applied to the orthogonal transform coefficients D6 (S104). Then, the orthogonal transform coefficients D6 undergo the arithmetic coding by use of the set probability table (S105), thus obtaining the coded data D7.

Here, in the image coding method of this embodiment, in the case of carrying out the arithmetic coding for the orthogonal transform coefficients D6, the probability table to be applied is switched in accordance with a value of a spatial frequency in a predetermined orthogonal transform coefficient among the plurality of orthogonal transform coefficients D6. Specifically, for example, a probability table different from those for other orthogonal transform coefficients is previously prepared and applied to the predetermined orthogonal transform coefficient among the plurality of orthogonal transform coefficients D6. Alternatively, the probability table applied to the predetermined orthogonal transform coefficient is switched separately from those for the other orthogonal transform coefficients in accordance with the coding conditions and the like.

The effect of the image coding method according to this embodiment will be described.

In the image coding method shown in FIG. 5, the spatial image data D5 is transformed into the orthogonal transform coefficients D6 as the frequency image data by the orthogonal transform. Then, the orthogonal transform coefficients undergo the arithmetic coding, thus generating the coded data D7 subjected to the data compression. Subsequently, in the arithmetic coding of the orthogonal transform coefficients D6, the data characteristics of the orthogonal transform coefficients D6 to be coded, which depend on the spatial frequency, are considered. Then, the probability table is switched for one or a plurality of the orthogonal transform coefficients separately from those for the other orthogonal transform coefficients, thus carrying out the arithmetic coding for the orthogonal transform coefficients D6.

As described above, the probability table is set by use of a context regarding the value of the spatial frequency of the orthogonal transform coefficient, and thus the data characteristics owned by the orthogonal transform coefficients D6 as the image data are reflected on the coding conditions in the arithmetic coding. Accordingly, the redundancy of the image data is removed effectively, thus making it possible to enhance the efficiency of the data compression in the coded data D7. Note that a specific method for switching the probability table will be described later in detail.

Figure 6:
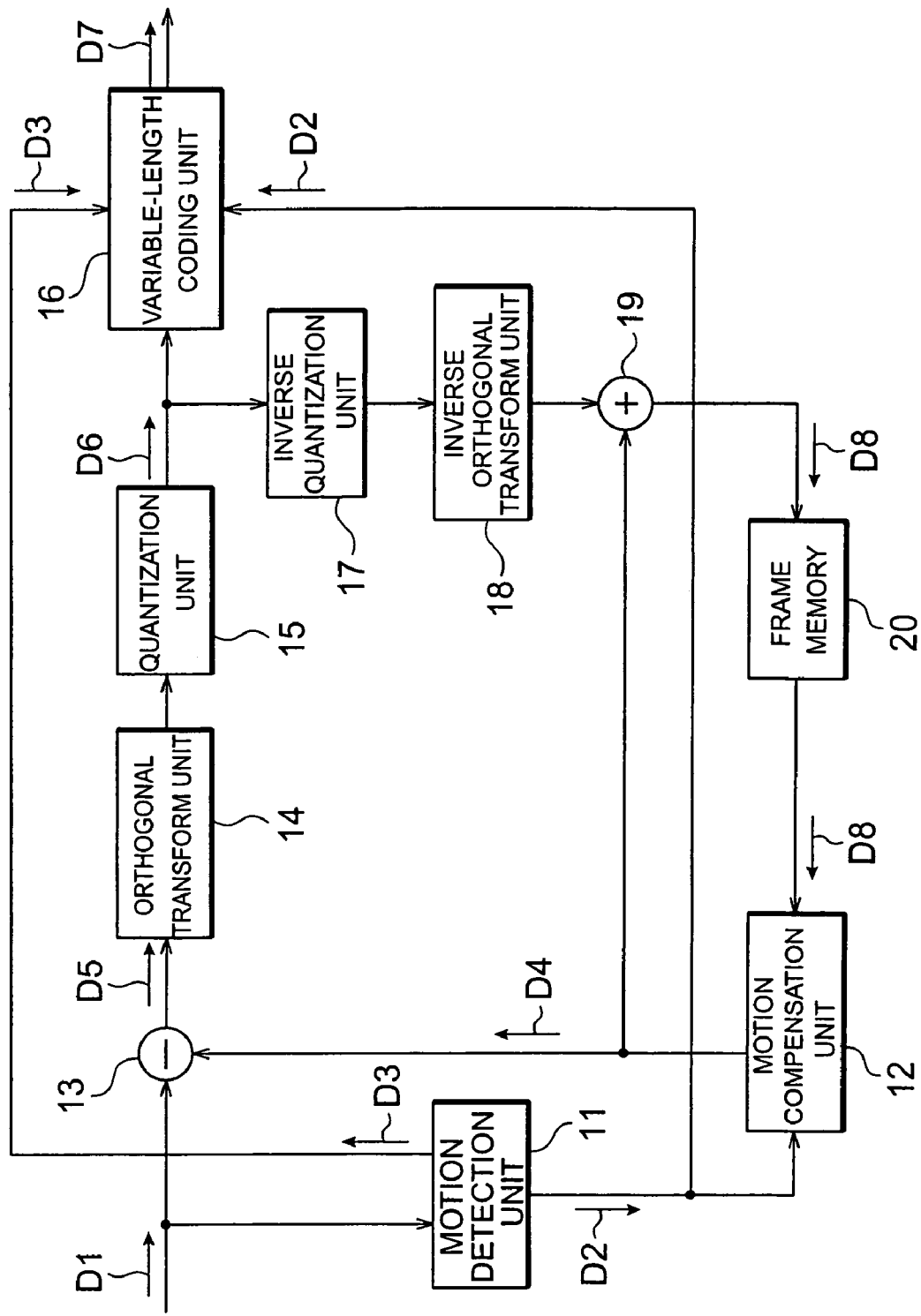
FIG. 6 is a block diagram illustrating a constitution of one embodiment of an image coding apparatus.
Figure 7A:
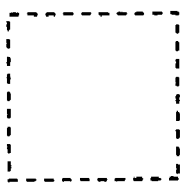
FIGS. 7A to 7J are schematic diagrams illustrating an example of coding modes for use in motion compensation.
Figure 7B:
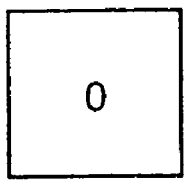
Figure 7C:
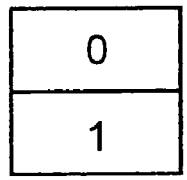
Figure 7D:
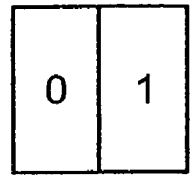
Figure 7E:
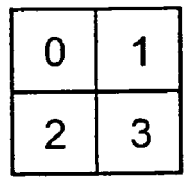
Figure 7F:
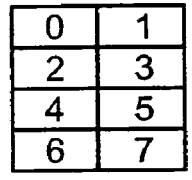
Figure 7G:
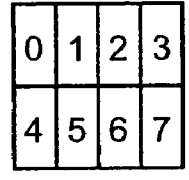
Figure 7H:
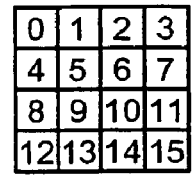
Figure 7I:
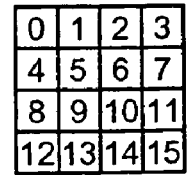
Figure 7J:
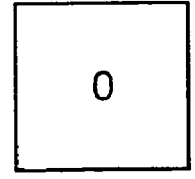

FIG. 6 is a block diagram illustrating a constitution of one embodiment of the image coding apparatus according to the present invention. Description will be further made below for the image coding method shown in FIG. 5 with reference to the image coding apparatus shown in FIG. 6. Note that, in the following description, a moving picture composed of time-series frame images is mainly assumed as an object to be coded with regard to the input frame image D1 inputted to the image coding apparatus. However, the image coding method and apparatus according to the present invention can be applied similarly also to a static image composed of one frame.

The input frame image D1 to be inputted as an object to be coded is first divided into square image blocks, each having a size of 16 pixels×16 lines. Each of these image blocks is an image block serving as a unit for data processing such as motion compensation, and is called a macroblock. Note that a DCT block having a size of 4 pixels×4 lines is used in the DCT (orthogonal transform) to be described later, for example, in the H.26L coding scheme. In this case, one macroblock has sixteen luma blocks and eight chroma blocks in the DCT. The image coding is carried out for each of the blocks.

The frame image D1 is inputted to the motion detection unit 11, and the motion of the image is detected for each macroblock. The motion detection unit 11 compares image data in the macroblock, from which the motion is to be detected, with image data in other macroblocks in the input frame image or other frame images. Thus, the motion detection unit 11 detects the motion vector D2 indicating the motion of the image.

Specifically, the motion detection unit 11 refers to a specified image area in the locally decoded image D8 as a frame image having been coded, the image D8 being stored in the frame memory 20. Then, the motion detection unit 11 finds out a pattern analogous to the macroblock of the input frame image D1 to be coded currently. Subsequently, the motion detection unit 11 determines the motion vector D2 by a spatial movement amount between the analogous pattern and the macroblock. Moreover, in this event, a coding mode for use in the motion compensation in the macroblock is selected from a plurality of coding modes prepared for the motion compensation.

FIGS. 7A to 7J are schematic diagrams illustrating an example of coding modes prepared for the motion compensation. In the coding modes exemplified in FIGS. 7A to 7J, there are prepared ten coding modes including: the skip mode 0 in which the motion compensation is not carried out; the inter modes 1 to 7 in which the inter-frame coding is carried out by use of block partitions to motion compensation blocks, the block partitions being different from one another; and the intra modes 8 and 9 in which the intra-frame coding is carried out by use of block partitions different from each other. Note that the foregoing motion vector D2 is imparted to each macroblock for each of the partitioned motion compensation blocks.

After the motion vector D2 is obtained, a motion prediction image is generated in the motion compensation unit 12 by use of the motion vector D2 from the motion detection unit 11 and the locally decoded image D8 from the frame memory 20. The motion vectors D2 are determined for the entire macroblocks included in the frame image D1 to generate the motion prediction image, thus obtaining the prediction frame image D4 for the input frame image D1.

Subsequently, in the subtractor 13, the difference (prediction residual) frame image D5 between the input frame image D1 and the prediction frame image D4 is generated. Moreover, in the case where the prediction frame image D4 is not prepared, the input frame image D1 is used as the frame image D5 as it is. This frame image D5 is image data represented by the spatial coordinates similarly to the input frame image D1. This spatial image data D5 becomes an object of the orthogonal transform and the arithmetic coding afterward.

The image data of the difference frame image D5 is inputted to the orthogonal transform unit (orthogonal transform means) 14. In the orthogonal transform unit 14, the orthogonal transform is carried out to the difference frame image D5 by the spatial coordinates for each of the orthogonal transform blocks (for example, sixteen luma blocks and eight chroma blocks) included in the macroblock. Then, a plurality of orthogonal transform coefficients are generated as the image data by the spatial frequencies. Moreover, the orthogonal transform coefficients are quantized by a predetermined quantization parameter in the quantization unit 15, and thus the final orthogonal transform coefficient (quantization coefficient) D6 to be subjected to the arithmetic coding is obtained.

FIGS. 8A and 8B are diagrams illustrating an orthogonal transform of image data. The image data of each block divided for the purpose of the orthogonal transform in the frame image D5 is spatial image data. As exemplified by sixteen (4×4) image components in FIG. 8A, the image data is represented by 4×4 spatial image components all to $a_{44}$ defined by the horizontal and vertical coordinates. The orthogonal transform unit 14 transforms the spatial image data into the image data shown in FIG. 8B by the orthogonal transform using a predetermined transform method. This image data is frequency image data, which is represented by the orthogonal transform coefficients $f_{11}$ to $f_{44}$ as 4×4 frequency image components defined by the horizontal and vertical frequencies.

As a specific orthogonal transform, for example, the discrete cosine transform (DCT) can be applied. The DCT is an orthogonal transform using a term of cosine in the Fourier transform, and is often used in the image coding. The DCT is carried out for the spatial image data, and thus the DCT coefficients $f_{11}$ to $f_{44}$ as the frequency image data are generated. Note that, as shown in FIGS. 8A and 8B, the 4×4 DCT blocks are used as blocks for the orthogonal transform in the DCT, for example, in the H.26L coding scheme.

The orthogonal transform coefficients D6 generated by the orthogonal transform unit 14 and the quantization unit 15 undergo the variable-length coding by arithmetic coding using a predetermined probability table in the variable-length coding unit (coding means) 16. Thus, the coded data D7 as the compressed data of the input frame image D1 is generated.

Moreover, in addition to the orthogonal transform coefficients D6, the motion vector D2 detected by the motion detection unit 11 and the coding mode information D3 showing the coding mode selected in the motion detection unit 11 are inputted to the variable-length coding unit 16. These motion vector D2 and coding mode information D3 undergo the variable-length coding by the arithmetic coding using a predetermined probability table in the variable-length coding unit 16 similarly to the orthogonal transform coefficients D6, and then are multiplexed on the coded data D7.

Here, the setting of the probability table for use in the arithmetic coding in the variable-length coding unit 16 is the same as that described above regarding the image coding method shown in FIG. 5. Moreover, a probability table different from that used for the arithmetic coding of the orthogonal transform coefficients D6 is usually used in the arithmetic coding of the motion vector D2 and the coding mode information D3. Moreover, also in the arithmetic coding of the orthogonal transform coefficients D6, different probability tables may be used for the arithmetic coding of the luma blocks and for the arithmetic coding of the chroma blocks.

Furthermore, the orthogonal transform coefficients D6 generated in the orthogonal transform unit 14 and the quantization unit 15 are decoded by the inverse quantization unit 17 and the inverse orthogonal transform unit 18 in this image coding apparatus. Then, the decoded image data and the prediction frame image D4 are added together in the adder 19, and the locally decoded image D8 is generated. This locally decoded image D8 is stored in the frame memory 20, and is utilized for the motion compensation of other frame images.

Next, the image decoding method and the image decoding apparatus will be described.

Figure 9:
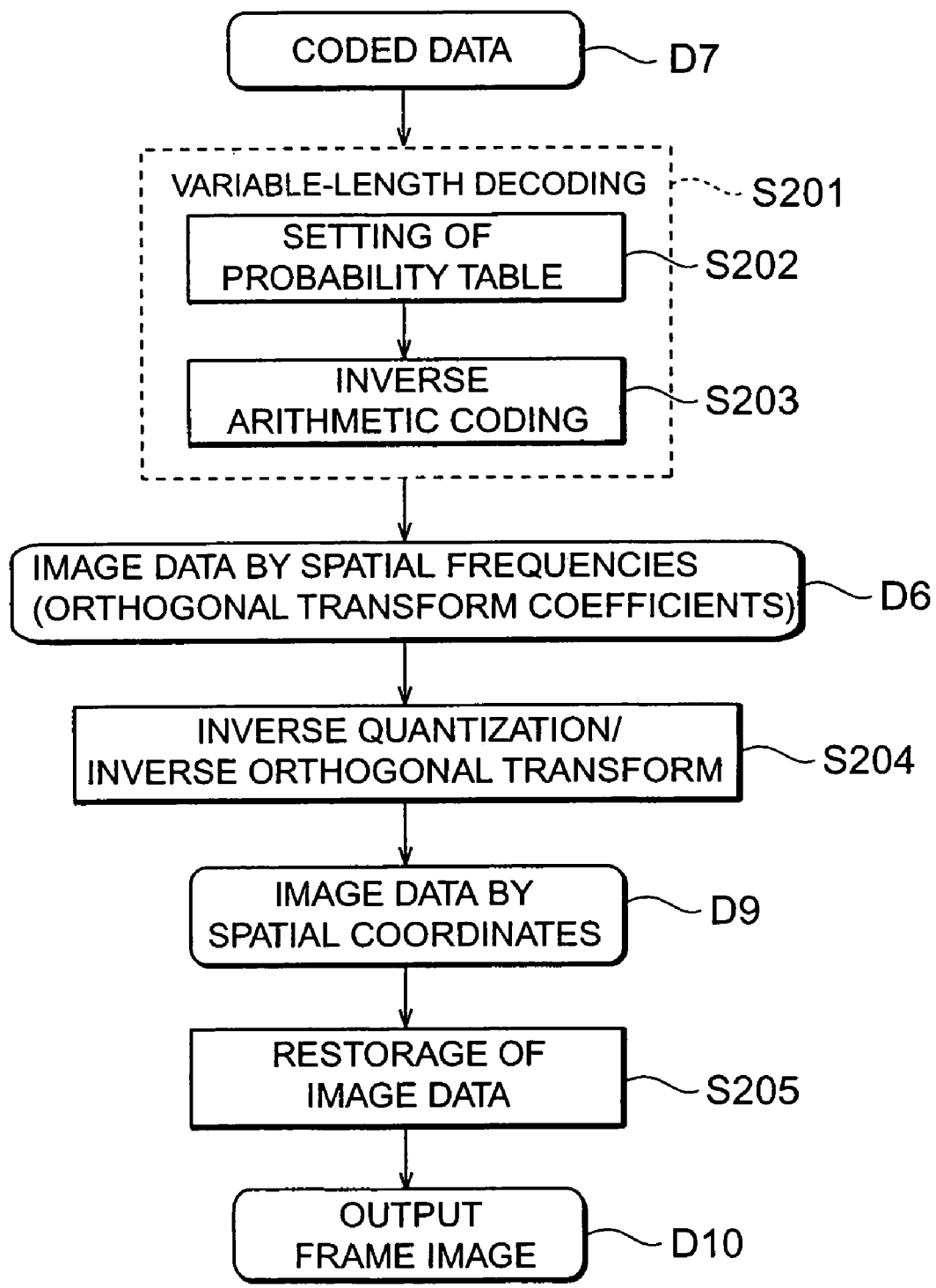
FIG. 9 is a flowchart schematically showing one embodiment of an image decoding method.

FIG. 9 is a flowchart schematically showing one embodiment of the image decoding method according to the present invention. This decoding method is an image decoding method, in which predetermined decoding and transform processing operations are carried out for the coded data D7 generated by the image coding method shown in FIG. 5, and an output frame image D10 is restored as an image corresponding to the input frame image D1.

In the image decoding method shown in FIG. 9, variable-length decoding is first carried out for the coded data D7 by use of inverse arithmetic coding, and a plurality of orthogonal transform coefficients (quantization coefficients) D6 as image data represented by spatial frequencies are generated (S201, decoding step). Specifically, a predetermined probability table is set as a probability table to be applied to the coded data D7 (S202). Then, the coded data D7 undergoes the inverse arithmetic coding by use of the set probability table (S203), thus obtaining the orthogonal transform coefficients D6 as frequency image data.

Here, in the image decoding method of this embodiment, in the case of carrying out the inverse arithmetic coding for the coded data D7, the probability table to be applied is switched in accordance with a value of a spatial frequency in a predetermined orthogonal transform coefficient among the plurality of orthogonal transform coefficients D6. Specifically, for example, a probability table different from those for other orthogonal transform coefficients is previously prepared and applied to the predetermined orthogonal transform coefficient among the plurality of orthogonal transform coefficients D6. Alternatively, the probability table applied to the predetermined orthogonal transform coefficient is switched separately from those for the other orthogonal transform coefficients in accordance with the coding conditions and the like.

Next, the inverse quantization and orthogonal transform operations are carried out sequentially for the plurality of orthogonal transform coefficients D6, and image data (spatial image data) D9 represented by spatial coordinates is generated (S204, inverse orthogonal transform step). Then, a predetermined data processing operation is carried out for the spatial image data D9 to transform the image data, thus restoring the output frame image D10 (S205).

The effect of the image decoding method according to this embodiment will be described.

In the image decoding method shown in FIG. 9, the coded data D7 subjected to data compression undergoes the inverse arithmetic coding to be decoded as the orthogonal transform coefficients D6, which are the frequency image data. Then, the orthogonal transform coefficients undergo the inverse orthogonal transform, thus generating the spatial image data D9. Subsequently, in the inverse arithmetic coding for the coded data D7, the data characteristics of the orthogonal transform coefficients D6 to be decoded, which depend on the spatial frequency, are considered. Then, the probability table is switched for one or a plurality of the orthogonal transform coefficients separately from those for the other orthogonal transform coefficients, thus carrying out the inverse arithmetic coding for the orthogonal transform coefficients D6 similarly to the case of the foregoing arithmetic coding.

As described above, the probability table is set by use of a context regarding the value of the spatial frequency of the orthogonal transform coefficient, and thus the data characteristics owned by the orthogonal transform coefficients D6 themselves as the image data are reflected on the decoding conditions in the inverse arithmetic coding. Accordingly, the redundancy of the image data is removed effectively, thus making it possible to suitably restore the image data from the coded data D7 in which the efficiency of the data compression is enhanced.

Figure 10:
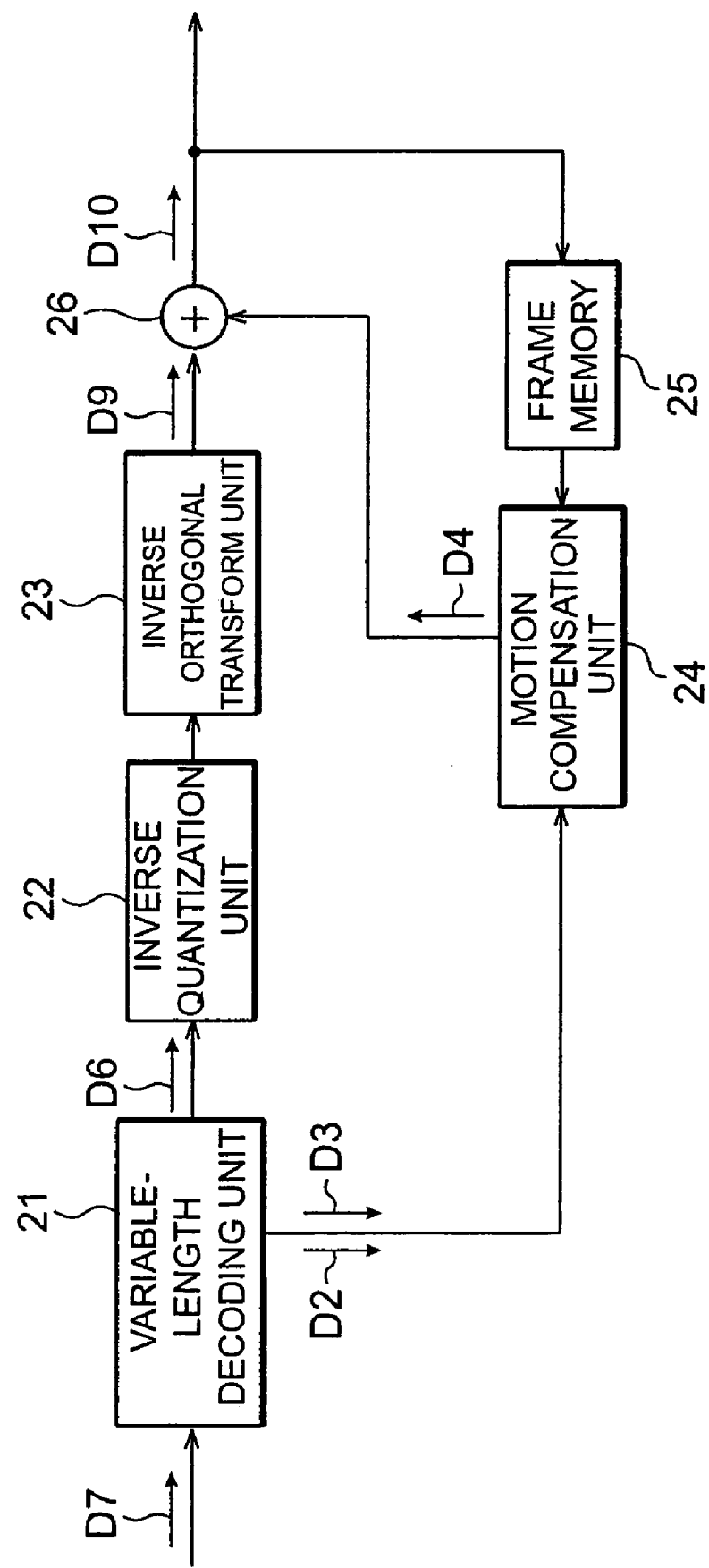
FIG. 10 is a block diagram illustrating a constitution of one embodiment of an image decoding apparatus.

FIG. 10 is a block diagram showing a constitution of one embodiment of the image decoding apparatus according to the present invention.

The coded data D7 to be inputted as an object to be decoded is inputted to the variable-length decoding unit (decoding means) 21 and undergoes the variable-length decoding by the inverse arithmetic coding using a predetermined probability table, and thus the plurality of orthogonal transform coefficients D6 are generated. For the coded data D7 subjected to the data compression, the variable-length decoding unit 21 detects a synchronization word indicating the header of the frame image, then decodes each piece of data included in the coded data D7 for each macroblock, and generates the orthogonal transform coefficients D6 as the frequency image data, the motion vector D2 and the like. Note that the probability table for use in the arithmetic coding is appropriately switched as described above.

The orthogonal transform coefficients D6 decoded in the variable-length decoding unit 21 undergo the inverse quantization and the inverse orthogonal transform by the inverse quantization unit 22 and the inverse orthogonal transform unit (inverse orthogonal transform means) 23. Thus, restored difference frame image D9 as the spatial image data is generated. This restored difference frame image D9 is a frame image corresponding to the difference frame image D5 prior to the coding.

Meanwhile, the motion vector D2 is inputted to the motion compensation unit 24. In the motion compensation unit 24, the prediction frame image D4 is generated by use of the motion vector D2 from the variable-length decoding unit 21 and other frame images stored in the frame memory 25. Then, in the adder 26, the restored difference frame image D9 and the prediction frame image D4 are added together, and the restored frame image is outputted as the output frame image D10.

Here, processing activities of the image coding method executed in the above image coding apparatus are feasible by an image coding program for causing a computer to execute the image coding. Further, processing activities of the image decoding method executed in the above image decoding apparatus are feasible by an image decoding program for causing a computer to execute the image decoding.

For example, the image coding apparatus can be configured by using a CPU, a ROM connected to the CPU and storing respective software programs necessary for processing operations of the image coding, and a RAM connected to the CPU and temporarily storing data during execution of the program. In this configuration, the image coding apparatus is realized by executing the specific image coding program by the CPU.

Similarly, the image decoding apparatus can be configured by using a CPU, a ROM connected to the CPU and storing respective software programs necessary for processing operations of the image decoding, and a RAM connected to the CPU and temporarily storing data during execution of the program. In this configuration, the image decoding apparatus is realized by executing the specific image decoding program by the CPU.

Moreover, the foregoing program for allowing the CPU to execute the respective processing for image coding or image decoding is distributable by being recorded in a computer-readable record medium. Such a record medium includes, for example: a magnetic medium such as a hard disc, a flexible disk and the like; an optical medium such as a CD-ROM, a DVD-ROM and the like; a magneto-optical medium such as a floptical disk and the like; a hardware device such as, for example, a RAM, a ROM, a semiconductor nonvolatile memory and the like, which is specially disposed so as to execute or store program instructions; and the like.

Further, the foregoing program for causing the computer to execute the image coding or image decoding can be made into a computer data signal embodied in carrier wave. Accordingly, the image coding program or image decoding program can be carried through the cable or wireless carrying path or the like.

Description will be made below for the procedure of the arithmetic coding (variable-length coding) of the orthogonal transform coefficients and suitable coding conditions thereof in the image coding method and apparatus shown in FIGS. 5 and 6 while showing a specific example. Here, the description is made by assuming the DCT as the orthogonal transform for transforming the spatial image data into the frequency image data, and by exemplifying the coding of the DCT coefficients in the ITU-T H.26L coding scheme. Note that the coding method and conditions described below can be applied to the image decoding method and apparatus shown in FIGS. 9 and 10 similarly. Moreover, the specific coding system is not limited to the foregoing H.26L coding scheme.

Figures 11A, 11B, 11C, 11D:
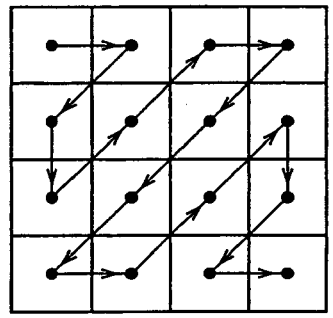
FIGS. 11A to 11D are diagrams illustrating arithmetic coding of DCT coefficients.

First, description will be made for the specific procedure of the arithmetic coding of the DCT coefficients with reference to FIGS. 11A to 11D and FIG. 12. FIG. 11A illustrates one specific example of numerical values for the 4×4 DCT coefficients (quantization coefficients) $f_{11}$ to $f_{44}$ shown in FIG. 8B. In the variable-length coding unit of the image coding apparatus, the arithmetic coding is carried out for the DCT coefficients as described above by a predetermined processing procedure, and the coded data is generated.

In the DCT coefficients $f_{11}$ to $f_{44}$ as the frequency image components in the image data represented by the spatial frequencies, unlike the spatial image components $a_{11}$ to $a_{44}$ (see FIG. 8A) in the image data represented by the spatial coordinates, each DCT coefficient has data characteristics regarding the size of the coefficient value thereof, which depend on a value of a spatial frequency corresponding thereto. Specifically, in each DCT coefficient $f_{ij}$, index values thereof i and j denote vertical and horizontal frequencies corresponding thereto, respectively. The plurality of DCT coefficients $f_{11}$ to $f_{44}$ have data characteristics (for example, data trends) different from one another, depending on the values of the vertical and horizontal frequencies thereof.

For example, with regard to DCT coefficients such as $f_{11}$, $f_{12}$ and $f_{21}$, in which the index values i and j are small and the values of the spatial frequencies are in a low frequency range, and DCT coefficients such as $f_{44}$, $f_{43}$ and $f_{34}$, in which the index values i and j are large and the values of the spatial frequencies are in a high frequency range, the sizes of the coefficient values and the data characteristics regarding the probability that the coefficient value is 0 and the like are different therebetween. Generally, in a natural image, a large coefficient value of the orthogonal transform is obtained in the low frequency range, and the coefficient value is reduced as the frequency is increased.

In the image coding method and apparatus shown in FIGS. 5 and 6, the data characteristics of the DCT coefficients as described above, which depend on the spatial frequency, are considered. Then, as described above, the probability table is switched for the DCT coefficients to be coded in accordance with the value of the spatial frequency, and then the arithmetic coding is carried out. Thus, the efficiency of the coding is enhanced.

In the processing procedure of the arithmetic coding of the DCT coefficients, the DCT coefficients $f_{11}$ to $f_{44}$ as two-dimensional data are first transformed into one-dimensional data by a zigzag scan shown in FIG. 11B. In this zigzag scan, the DCT coefficients are scanned such that the one-dimensional data after the scan becomes a data sequence in which the DCT coefficients are arrayed from the low frequency range toward the high frequency range.

Specifically, the DCT coefficients are scanned zigzag in the following manner. The scan is started from the DCT coefficient $f_{11}$ having the lowest spatial frequency value (i+j=2), then the scan is sequentially executed for the coefficients $f_{12}$, and $f_{21}$ (i+j=3), the coefficients $f_{31}$, $f_{22}$, and $f_{13}$ (i+j=4), . . . in this order toward the DCT coefficient $f_{44}$ having the highest spatial frequency value (i+j=8). Thus, the one-dimensional data shown in FIG. 11C is obtained, in which the DCT coefficients are arrayed from the low frequency range toward the high frequency range.

This one-dimensional data of the DCT coefficients is further transformed into data composed of "Level" and "Run", which is shown in FIG. 11D, in order to decrease a data amount thereof. Here, the "Level" represents coefficient levels in the DCT coefficients having coefficient values that are not 0 among the plurality of DCT coefficients. Moreover, the "Run" represents run lengths as the numbers of data of which coefficient values are 0, the data being located immediately before the DCT coefficients that are not 0.

For example, in the data example of the DCT coefficients, which is shown in FIG. 11A, sixteen DCT coefficients $f_{11}$ to $f_{44}$ are partitioned into: the coefficient group $s_1$ composed of the coefficient $f_{11}$; the coefficient group $s_2$ composed of the coefficients $f_{12}$ and $f_{21}$; the coefficient group $s_3$ composed of the coefficients $f_{31}$ to $f_{13}$; the coefficient group $s_4$ composed of the coefficients $f_{14}$ to $f_{32}$; and the coefficient group $s_5$ composed of the coefficients $f_{41}$ to $f_{44}$, based on the appearing positions of the DCT coefficients having coefficient values that are not 0 as shown in FIG. 11C.

Then, as shown in FIG. 11D, the Level and Run values are obtained for these coefficient groups $s_1$ to $s_5$, respectively. Specifically, in the coefficient group $s_1$, the Level value is $f_{11}$=10, and the Run value is 0. In the coefficient group $s_2$, the Level value is $f_{21}$=2, and the Run value is 1. In the coefficient group $s_3$, the Level value is $f_{13}$=−1, and the Run value is 2. In the coefficient group $s_4$, the Level value is $f_{32}$=1, and the Run value is 2.

The final coefficient group $s_5$ is a coefficient group in which the coefficient values of the entire coefficients $f_{41}$ to $f_{44}$ are 0. The coefficient group $s_5$ becomes an EOB (end of block) of valid data in the DCT coefficients shown in FIG. 11A. Accordingly, in this coefficient group $s_5$, 0 denoting the EOB symbol is taken as a Level value.

Note that, if the entire DCT coefficients are 0 in the data of the DCT coefficients for a DCT block, then the DCT coefficients are not to be subjected to the arithmetic coding since the DCT block is invalid. Whether the DCT block as described above is valid or invalid is designated by, for example, a coded block pattern (CBP) given to each macroblock. This CBP designates whether the block is valid or invalid for each of the sixteen luma blocks and the eight chroma blocks, which are included in the macroblock.

The data composed of the "Level" and the "Run", which are shown in FIG. 11D, is binarized by use of a specified binarization table, and a binarization pattern to be subjected to the arithmetic coding is prepared. FIG. 12 is a table showing an example of a binarization table for use in binarizing the Level data shown in FIG. 11D. In this binarization table, 0, 1, 2, 3 . . . that are Level values are binarized by pattern lengths different from one another.

After the respective pieces of Level and Run data are binarized, these data undergo the arithmetic coding by use of a predetermined probability table in order of Level of $s_1$, Run of $s_1$, Level of $s_2$, Run of $s_2$, . . . , Level of $s_5$. Thus, the code word as coded data corresponding to the orthogonal transform coefficients of FIG. 11A is generated.

Here, with regard to the probability table for use in the arithmetic coding for the DCT coefficients, in each macroblock, different probability tables may be used for the interframe coding and the intra-frame coding or for the luma block and the chroma block. Moreover, different probability tables may be used in accordance with code positions of binarization codes in the arithmetic coding of the binarization pattern as shown in FIG. 12. For example, different probability tables may be used for the first binarization code in Bin_no. (code position) 1, binarization codes in Bin_no. 2, binarization codes in Bin_no. 3 or more, and code data indicating whether the binarization pattern is positive or negative.

Furthermore, in the image coding method and apparatus shown in FIGS. 5 and 6, as described above, the probability table to be applied is switched in accordance with the value of the spatial frequency in the predetermined DCT coefficient among the DCT coefficients $f_{11}$ to $f_{44}$.

Here, as a method for partitioning the DCT coefficients for switching the probability table to be applied, a method for switching a probability table to be applied for the first coefficient group and the second coefficient group is cited, in which the plurality of DCT coefficients $f_{11}$ to $f_{44}$ are divided into the first coefficient group having low values of the spatial frequencies and the second coefficient group having high values of the spatial frequencies.

In the DCT coefficients (orthogonal transform coefficients) as the frequency image data, as described above, the data characteristics are different between the DCT coefficients in the low frequency range and the DCT coefficients in the high frequency range. Accordingly, the DCT coefficients are divided into two coefficient groups that are the low and high frequency ranges, the probability table is switched therefore, respectively, and thus the data characteristics of the DCT coefficients, which depend on the spatial frequencies, can be effectively reflected on the coding conditions in the arithmetic coding.

As a specific method for partitioning the DCT coefficients, for example, there is a partition in which the first orthogonal transform coefficient to be coded in the arithmetic coding is defined as the first coefficient group G1. This corresponds to that the coefficient group $s_1$ shown in FIG. 11C, which is composed of the orthogonal transform coefficients having the lowest spatial frequency value among the orthogonal transform coefficients that are not 0, is defined as the first coefficient group G1, and that the other coefficients are defined as the second coefficient group G2.

Figure 13A:
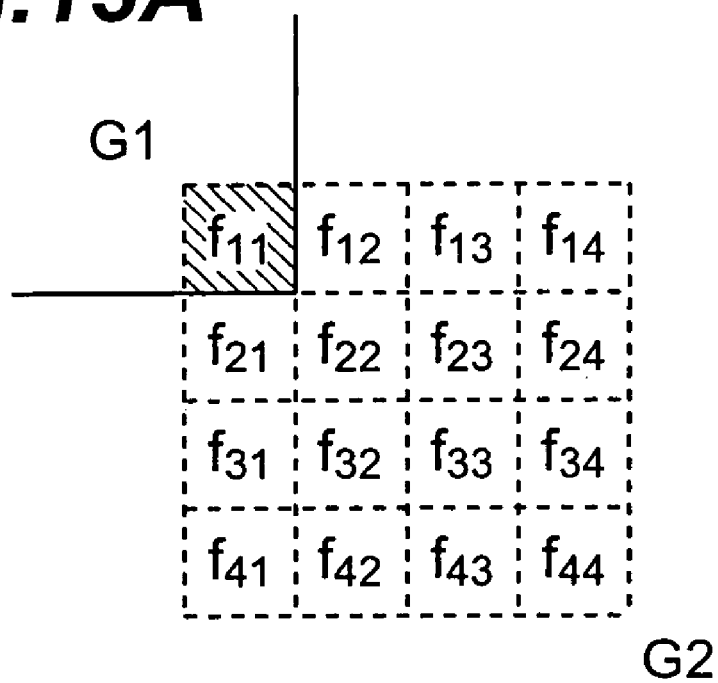
FIGS. 13A and 13B are diagrams illustrating an example of a method for partitioning the DCT coefficients for switching a probability table.

For example, if the DCT coefficient $f_{11}$ having the lowest spatial frequency value in the entire coefficients is not 0, then, as shown in FIG. 13A, the one DCT coefficient $f_{11}$ is partitioned as the first coefficient group G1, and other fifteen DCT coefficients $f_{12}$ to $f_{44}$ are partitioned as the second coefficient group G2. It is when the entire orthogonal transform coefficients in the block are 0 that the coefficients in the coefficient group $s_1$ become 0, which accordingly means differently from that the coefficients in the other coefficient groups become 0. Hence, the first DCT coefficient to be coded is defined as the first coefficient group G1, and the probability table is switched therefore separately from the other DCT coefficients, thus making it possible to enhance the efficiency of the data compression in the coded data.

Figure 13B:
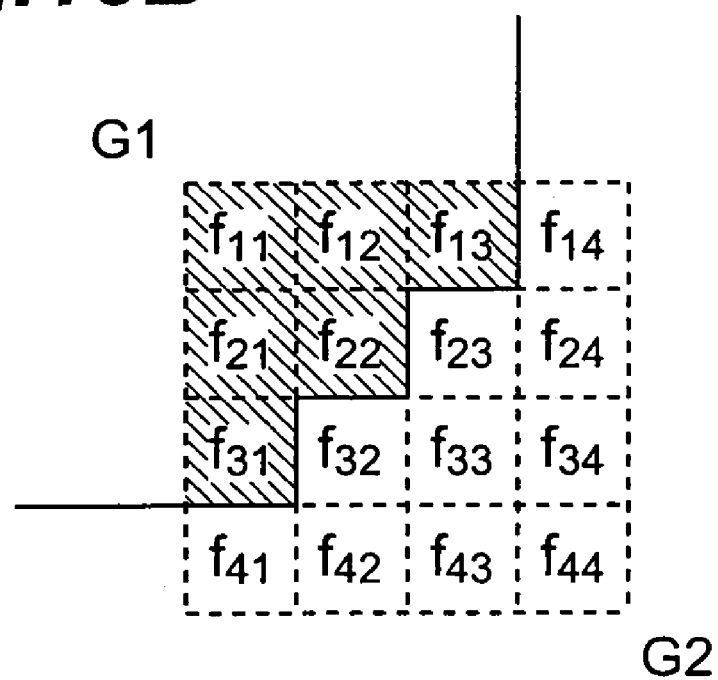

Alternatively, as shown in FIG. 13B, a partition may be used, in which the six DCT coefficients $f_{11}$ to $f_{31}$ in which the values i+j in $f_{ij}$ are in a range from 2 to 4 are defined as the fist coefficient group G1, and other ten DCT coefficients $f_{14}$ to $f_{44}$ are defined as the second coefficient group G2. In such a partition, the first coefficient group G1 and the second coefficient group G2 are different from each other in the probability that the coefficient becomes 0 and the probability that the EOB appears. Accordingly, the efficiency of the data compression in the coded data can be enhanced by switching the probability table in these coefficient groups. Moreover, partitioning methods other than the above may be used. Alternatively, the DCT coefficients are partitioned into three or more coefficient groups, and the probability table to be applied may be switched, respectively.

Figure 4:
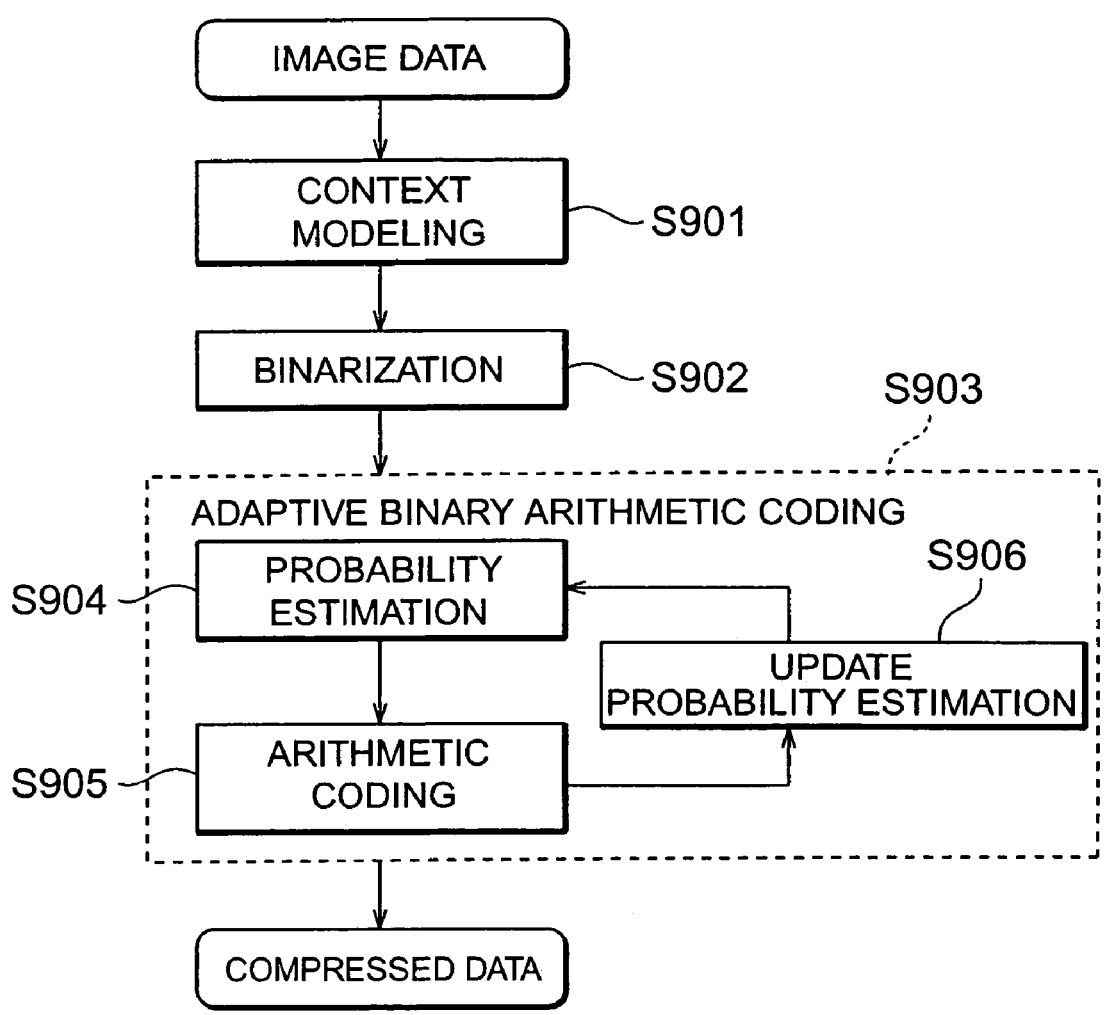
FIG. 4 is a flowchart showing an example of an image coding method using the arithmetic coding.

As a method for switching a probability table for the DCT coefficients, a method for switching a probability table in advance in accordance with estimated data characteristics in the respective DCT coefficients can be used. Alternatively, the switching and update of the probability table may be carried out by the coding method (CABAC) using the context modeling shown in FIG. 4.

Figure 14:
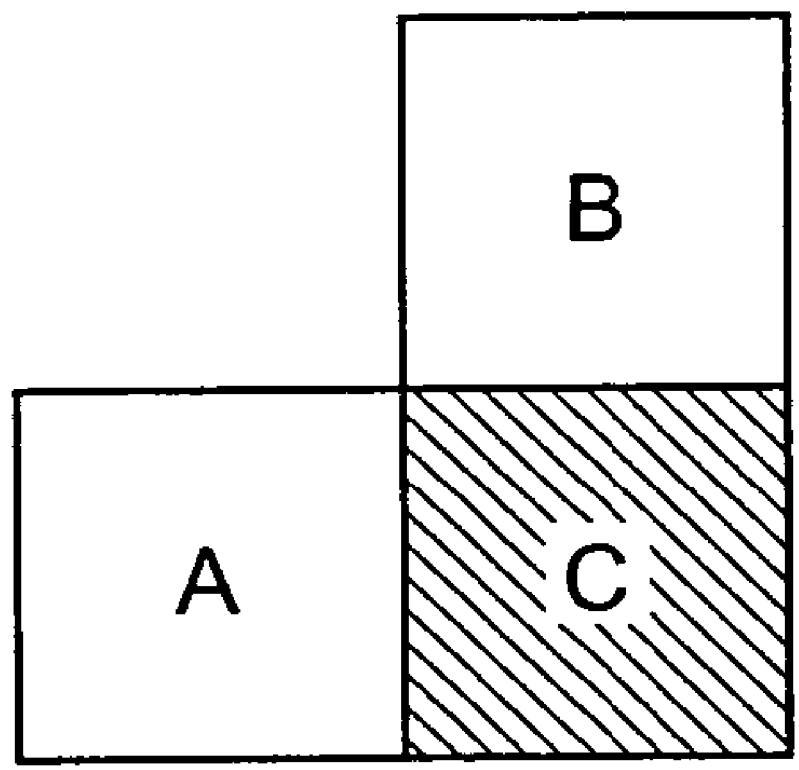
FIG. 14 is a diagram illustrating context modeling, in which blocks A and B adjacent to a block C to be coded are referred to for the block C.

As a specific example of the context modeling, for example, as shown in FIG. 14, the adjacent block A located on the left side of the block C to be coded and the adjacent block B located on the block C are assumed. There is a method for switching a probability table to be applied to the block C by referring to processing results of the image coding in the two blocks A and B adjacent to the block C.

There is a high possibility that the image data of the block C to be coded becomes image data analogous to the image data of the coded blocks A and B adjacent to the block C, as a general property of an image. Accordingly, the probability table is switched by use of the context modeling that refers to the processing results of the image coding in the adjacent blocks as described above, thus making it possible to decrease the redundancy in the coded data in accordance with the coding conditions. As a result, the efficiency of the data compression can be enhanced.

Description will be made for an example of a specific method for switching a probability table in the case of partitioning the DCT coefficients into two coefficient groups by the partitioning method shown in FIG. 13A. The first DCT coefficient to be coded in the coefficient group $s_1$ set in the coefficient group G1, which is different from the other DCT coefficients in the coefficient group G2, is a coefficient indicating the existence of the orthogonal transform coefficient that is not 0 in the block as described above. Therefore, for example in the case of a motion compensation block, if there is no motion change in a block adjacent thereto and no DCT coefficient is generated, then there is a high probability that no DCT coefficient is generated similarly in the concerned block.

It is possible to apply the context modeling shown in FIG. 14, which refers to the adjacent blocks A and B for the block C to be coded, by use of the data characteristics of the first DCT coefficient to be coded. Specifically, if the existence of the DCT coefficient that is not 0 in the processing results of the image coding in the adjacent blocks A and B is referred to, and if the context modeling is carried out, in which the probability table is switched for the first DCT coefficient to be coded in the block C, then the redundancy of the coded data in the block C can be decreased.

FIG. 15 is a table showing correlations between the existences of the DCT coefficients that are not 0 in the adjacent blocks A and B and the frequencies and probabilities that the entire DCT coefficients in the block C are 0. In this table, A+B=0 indicates the case where the DCT coefficient that is not 0 did not exist in either of the adjacent blocks A and B. Moreover, A+B=1 indicates the case where the DCT coefficient that is not 0 existed in any one of the adjacent blocks A and B. Furthermore, A+B=2 indicates the case where the DCT coefficients that are not 0 existed in both of the adjacent blocks A and B.

Here, as image data to be coded for the purpose of confirming the correlations among the DCT coefficients, a test image "Foreman" was used. Moreover, the quantization parameter QP was set at 10 in the intra mode, and the QP was set at 16 in the inter mode. For the video size, a QCIF (longitudinal 176×lateral 144) was used.

As shown in the table of FIG. 15, in any of the intra mode and the inter mode, the probabilities of C=0 (the entire DCT coefficients in the block C are 0) are the highest in the case of A+B=0, and the probabilities of C=0 are lowered as A+B is increased. Moreover, when the probabilities of C=0 in the case of A+B=0 are compared with each other, the probability is larger in the inter mode in which the correlations among the DCT coefficients are relatively large.

In the above-described manner, the probability table for the DCT coefficients in the block C is switched with reference to the values 0, 1 and 2 of A+B by the left-side and upper-side blocks adjacent thereto, thus making it possible to enhance the efficiency of the data compression in the coded data. Moreover, with regard to the switching of the probability table for the DCT coefficients in this case, specifically, it is preferable to switch the probability table for the binarization code in Bin_no. 1, which is the first binarization code included in the binarization pattern in consideration of the binarization table shown in FIG. 12.

Usually, the first binarization code in the binarization pattern, which corresponds to an orthogonal transform coefficient, is a code indicating whether the Level value of the orthogonal transform coefficient to be coded is 0 or 1 or more. Accordingly, the probability table to be applied to this binarization code is switched, thus making it possible to effectively enhance the efficiency of the data compression. Alternatively, the probability table for binarization codes in other code positions (Bin_no.) may be switched similarly.

FIG. 16 is a table showing effects of decreasing code amounts by the switching of the probability table for the first DCT coefficient to be coded, which is described above. This table shows code amounts in the case of coding an image by use of the CABAC of the conventional H.26L coding scheme, code amounts in the case of coding an image by use of the method of the present invention, in which the probability table is switched for the first DCT coefficient to be coded, and decrease ratios of code amounts, which are obtained by using the method for switching a probability table.

Here, with regard to the image data to be coded for the purpose of confirming the decrease ratios of the code amounts, and the quantization parameters QP for use in the image coding, the following four conditions were employed: (a) QP=24 in the test image "Foreman"; (b) QP=16 in the test image "Foreman"; (c) QP=24 in the test image "Stefan"; and (d) QP=16 in the test image "Stefan". Thus, the image coding was carried out.

As shown in the table of FIG. 16, the effect of decreasing the code amounts by the switching of the probability table is obtained in the image coding under each of the four conditions. Moreover, in any of the test images "Foreman" and "Stefan", a larger effect of decrease is obtained under the condition where the quantization parameter QP is larger and the probability that the DCT coefficients become 0 is higher.

Next, description will be made for an example of a specific method for switching a probability table in the case of partitioning the DCT coefficients into two coefficient groups by the partitioning method shown in FIG. 13B. In the DCT coefficients as the frequency image data, in general, the coefficient values are reduced from the low frequency range toward the high frequency range. Therefore, the appearance probabilities of the EOBs showing the ends of the valid data that is not 0 in the DCT coefficients are different between the first coefficient group G1 in the low frequency range and the second coefficient group G2 in the high frequency range.

Accordingly, if the probability table indicating whether or not the data is the EOB for Bin_no. 1 is switched between the first coefficient group G1 and the second coefficient group G2, then the redundancy in the coded data to be generated can be decreased. Moreover, the probability table for the blocks other than the EOB may be switched.

As a method for switching a probability table in this case, for example, there is a method for switching a probability table between the first coefficient group G1 and the second coefficient group G2, in which the quantization parameters QP used for quantizing the DCT coefficients are referred to.

In the case of quantizing the DCT coefficients, the data characteristics of the quantized DCT coefficients are affected by the quantization parameters used for the quantization. For example, when the switching of the probability table for the EOBs is assumed, if the quantization parameter is increased, then the EOBs are apt to be generated in the DCT coefficient in a lower frequency range. Accordingly, the probability table is switched with reference to the quantization parameters, thus making it possible to decrease the redundancy of the coded data in accordance with the quantization conditions. As a result, the efficiency of the data compression can be enhanced. In this case, the probability table may be switched by varying the partition position of the coefficient groups G1 and G2.

Moreover, the switching of the probability table and the varying of the partition position of the coefficient groups, which are described above, can be also carried out by use of the context modeling shown in FIG. 14, in which the blocks A and B adjacent to the block C are referred to for the block C. For example, in a general image, the appearing positions of the EOBs tend to be spatially continuous to each other, such as in the case where image blocks composed of direct current components only are made continuous. Accordingly, if the context modeling is carried out, in which the positions of the EOBs are referred to based on the respective processing results in the two left-side and upper-side blocks A and B adjacent to the block C, then the redundancy of the coded data in the block C can be decreased.

Specifically, for example, there is a method, in which the positions of the EOBs in the blocks A and B adjacent to the block C are referred to, the positions of the EOBs are defined as the partition positions of the coefficient groups G1 and G2 in the block C, and different probability tables are used for the coefficient groups G1 and G2. In this case, if the positions of the EOBs are different between the blocks A and B adjacent to the block C, then it is preferable to set the partition position in the block C by a predetermined method, such as a method in which a position in the high frequency side, a position in the low frequency side, or a position at a mean value therebetween is selectively used.

Moreover, in the case where the orthogonal transform coefficient that is not 0 does not exist in either of the blocks A and B adjacent to the block C, and in the case where the partition position in the block C cannot be set with reference to the blocks A and B adjacent thereto because of the use of different coding modes such as the intra mode and the like, it is preferable to use a probability table prepared separately in advance.

Moreover, an upper limit or a lower limit is provided in advance for the partition position of the coefficient groups, which is to be set, and in the case where the positions of the EOBs in the blocks A and B adjacent to the block C are out of this range, the partition position at the upper or lower limit may be used. In the case of providing such upper and lower limits, it is preferable to set the partition position with reference to the quantization parameters used for quantizing the orthogonal transform coefficients.

Moreover, also in the switching of the probability table with reference to the positions of the EOBs, which is as described above, specifically, it is preferable to switch the probability table for the binarization code of Bin_no. 1 as the first binarization code included in the binarization pattern in consideration of the binarization table shown in FIG. 8.

Moreover, as for the switching of the probability table, various methods, in addition to the switching of the probability table by referring to the position of the EOB or the like, can be used. For example, the switching may be carried out with reference to the motion vector or the coding mode at the adjacent block, the value of the DCT coefficient, the number of the coefficients that are not 0, and so on.

FIG. 17 is a schematic diagram showing a constitution of one embodiment of an image transmission system (for example, a mobile video transmission system) according to the present invention. This image transmission system is constituted by including: the image coding apparatus (for example, the image coding apparatus shown in FIG. 6) 1 that realizes the image coding method shown in FIG. 5; and the image decoding apparatus (for example, the image decoding apparatus shown in FIG. 10) 2 that realizes the image decoding method shown in FIG. 9.

In this system, the input frame image D1 is coded in the image coding apparatus 1, the coded data D7 is generated, and the coded data D7 is outputted to a predetermined wired or radio transmission path. Then, the coded data D7 transmitted from the image coding apparatus 1 through the transmission path is inputted to the image decoding apparatus 2, and is restored as an output frame image D10.

According to the image transmission system as described above, the image can be transmitted efficiently by use of the coded data in which the characteristics of the image data to be coded are reflected on the coding conditions, resulting in the enhancement of the efficiency of the data compression.

INDUSTRIAL APPLICABILITY

As described above in detail, the image coding method, image decoding method, image coding apparatus, image decoding apparatus, program, computer data signal, and the image transmission system of the present invention are applicable as a method and apparatus and the like which are capable of enhancing the efficiency of the data compression in the coded data by reflecting the characteristics of the image data to be coded on the coding conditions.

Namely, according to the configuration in which, in the arithmetic coding or the decoding between the orthogonal transform coefficients and the coded data, the data characteristics of the orthogonal transform coefficients to be coded are considered, the data characteristics depending on the spatial frequencies, and the probability table for use in the arithmetic coding for the predetermined orthogonal transform coefficient among the plurality of orthogonal transform coefficients is switched, the data characteristics owned by the orthogonal transform coefficients themselves as the image data are reflected on the coding conditions in the arithmetic coding. Accordingly, the redundancy of the image data is removed effectively, thus making it possible to enhance the efficiency of the data compression in the coded data.

The invention claimed is:

1. An image coding method, in which an image is divided into blocks of a predetermined size and image data is coded for each of the blocks, the method comprising:

an orthogonal transform step of performing an orthogonal transform for image data of an image in the blocks, the image data being represented by spatial coordinates, to generate a plurality of orthogonal transform coefficients; and a coding step of performing variable-length coding for the plurality of orthogonal transform coefficients by arithmetic coding using a predetermined probability table to generate coded data, wherein, in the coding step, the probability table to be applied to a predetermined orthogonal transform coefficient among the plurality of orthogonal transform coefficients is switched in accordance with a value of a spatial frequency therein.

2. The image coding method according to claim 1, wherein, in the coding step, the plurality of orthogonal transform coefficients are divided into a first coefficient group having low values of the spatial frequencies and a second coefficient group having high values of the spatial frequencies, and the probability table to be applied is switched for the first coefficient group and the second coefficient group.

3. The image coding method according to claim 2, wherein the first coefficient group is composed of an orthogonal transform coefficient to be first coded.

4. The image coding method according to claim 1, wherein, in the coding step, the probability table is switched with reference to a processing result of image coding in a block adjacent to the block.

5. The image coding method according to claim 4, wherein, in the coding step, the probability table is switched with reference to an existence of the orthogonal transform coefficient that is not 0 in the processing result in the adjacent block.

6. The image coding method according to claim 5, wherein, in the coding step, the probability table is switched with reference to existences of the orthogonal transform coefficients that are not 0 in the processing results in the adjacent block located on a left side of the block and the adjacent block located thereon.

7. The image coding method according to claim 4, wherein, in the coding step, the probability table is switched with reference to a position of an EOB in the processing result in the adjacent block.

8. The image coding method according to claim 7, wherein, in the coding step, the probability table is switched with reference to positions of EOBs in the processing results in the adjacent block located on a left side of the block and the adjacent block located thereon.

9. The image coding method according to claim 1, wherein, in the coding step, the probability table is switched with reference to a quantization parameter for use in quantizing the plurality of orthogonal transform coefficients.

10. The image coding method according to claim 1, wherein, in the coding step, a binarization pattern obtained by binarizing the plurality of orthogonal transform coefficients undergoes variable-length coding by arithmetic coding, and the probability table to be applied to a first binary code included in the binarization pattern is switched.

11. An image decoding method, in which an image is divided into blocks of a predetermined size and coded data obtained by coding image data for each of the blocks is decoded, the method comprising:

a decoding step of performing variable-length decoding for the coded data by inverse arithmetic coding using a predetermined probability table to generate a plurality of orthogonal transform coefficients; and an inverse orthogonal transform step of performing an inverse orthogonal transform for the plurality of orthogonal transform coefficients to generate image data represented by spatial coordinates of the image in the blocks, wherein, in the decoding step, the probability table to be applied to a predetermined orthogonal transform coefficient among the plurality of orthogonal transform coefficients is switched in accordance with a value of a spatial frequency therein.

12. The image decoding method according to claim 11, wherein, in the decoding step, the plurality of orthogonal transform coefficients are divided into a first coefficient group having low values of the spatial frequencies and a second coefficient group having high values of the spatial frequencies, and the probability table to be applied is switched for the first coefficient group and the second coefficient group.

13. The image decoding method according to claim 12, wherein the first coefficient group is composed of an orthogonal transform coefficient to be first coded.

14. The image decoding method according to claim 11, wherein, in the decoding step, the probability table is switched with reference to a processing result of image coding in a block adjacent to the block.

15. The image decoding method according to claim 14, wherein, in the decoding step, the probability table is switched with reference to an existence of the orthogonal transform coefficient that is not 0 in the processing result in the adjacent block.

16. The image decoding method according to claim 15, wherein, in the decoding step, the probability table is switched with reference to existences of the orthogonal transform coefficients that are not 0 in the processing results in the adjacent block located on a left side of the block and the adjacent block located thereon.

17. The image decoding method according to claim 14, wherein, in the decoding step, the probability table is switched with reference to a position of an EOB in the processing result in the adjacent block.

18. The image decoding method according to claim 17, wherein, in the decoding step, the probability table is switched with reference to positions of EOBs in the processing results in the adjacent block located on a left side of the block and the adjacent block located thereon.

19. The image decoding method according to claim 11, wherein, in the decoding step, the probability table is switched with reference to a quantization parameter for use in quantizing the plurality of orthogonal transform coefficients.

20. The image decoding method according to claim 11, wherein, in the decoding step, a binarization pattern obtained by performing variable-length decoding for the coded data by inverse arithmetic coding is debinarized to generate the plurality of orthogonal transform coefficients, and the probability table to be applied to a first binary code included in the binarization pattern is switched.

21. An image coding apparatus, in which an image is divided into blocks of a predetermined size and image data is coded for each of the blocks, the apparatus comprising:
    orthogonal transform means for performing an orthogonal transform for image data of an image in the blocks, the image data being represented by spatial coordinates, to generate a plurality of orthogonal transform coefficients; and
    coding means for performing variable-length coding for the plurality of orthogonal transform coefficients by arithmetic coding using a predetermined probability table to generate coded data,
    wherein the coding means switches the probability table to be applied to a predetermined orthogonal transform coefficient among the plurality of orthogonal transform coefficients in accordance with a value of a spatial frequency therein.

22. The image coding apparatus according to claim 21, wherein the coding means divides the plurality of orthogonal transform coefficients into a first coefficient group having low values of the spatial frequencies and a second coefficient group having high values of the spatial frequencies, and switches the probability table to be applied for the first coefficient group and the second coefficient group.

23. The image coding apparatus according to claim 22, wherein the first coefficient group is composed of an orthogonal transform coefficient to be first coded.

24. The image coding apparatus according to claim 21, wherein the coding means switches the probability table with reference to a processing result of image coding in a block adjacent to the block.

25. The image coding apparatus according to claim 24, wherein the coding means switches the probability table with reference to an existence of the orthogonal transform coefficient that is not 0 in the processing result in the adjacent block.

26. The image coding apparatus according to claim 25, wherein the coding means switches the probability table with reference to existences of the orthogonal transform coefficients that are not 0 in the processing results in the adjacent block located on a left side of the block and the adjacent block located thereon.

27. The image coding apparatus according to claim 24, wherein the coding means switches the probability table with reference to a position of an EOB in the processing result in the adjacent block.

28. The image coding apparatus according to claim 27, wherein the coding means switches the probability table with reference to positions of EOBs in the processing results in the adjacent block located on a left side of the block and the adjacent block located thereon.

29. The image coding apparatus according to claim 21, wherein the coding means switches the probability table with reference to a quantization parameter for use in quantizing the plurality of orthogonal transform coefficients.

30. The image coding apparatus according to claim 21, wherein the coding means performs variable-length coding by arithmetic coding for a binarization pattern obtained by binarizing the plurality of orthogonal transform coefficients, and switches the probability table to be applied to a first binary code included in the binarization pattern.

31. An image decoding apparatus, in which an image is divided into blocks of a predetermined size and coded data obtained by coding image data for each of the blocks is decoded, the apparatus comprising:
    decoding means for performing variable-length decoding for the coded data by inverse arithmetic coding using a predetermined probability table to generate a plurality of orthogonal transform coefficients; and
    inverse orthogonal transform means for performing an inverse orthogonal transform for the plurality of orthogonal transform coefficients to generate image data represented by spatial coordinates of the image in the blocks,
    wherein the decoding means switches the probability table to be applied to a predetermined orthogonal transform coefficient among the plurality of orthogonal transform coefficients in accordance with a value of a spatial frequency therein.

32. The image decoding apparatus according to claim 31, wherein the decoding means divides the plurality of orthogonal transform coefficients into a first coefficient group having low values of the spatial frequencies and a second coefficient group having high values of the spatial frequencies, and switches the probability table to be applied for the first coefficient group and the second coefficient group.

33. The image decoding apparatus according to claim 32, wherein the first coefficient group is composed of an orthogonal transform coefficient to be first coded.

34. The image decoding apparatus according to claim 31, wherein the decoding means switches the probability table with reference to a processing result of image coding in a block adjacent to the block.

35. The image decoding apparatus according to claim 34, wherein the decoding means switches the probability table with reference to an existence of the orthogonal transform coefficient that is not 0 in the processing result in the adjacent block.

36. The image decoding apparatus according to claim 35, wherein the decoding means switches the probability table with reference to existences of the orthogonal transform coefficients that are not 0 in the processing results in the adjacent block located on a left side of the block and the adjacent block located thereon.

37. The image decoding apparatus according to claim 34, wherein the decoding means switches the probability table with reference to a position of an EOB in the processing result in the adjacent block.

38. The image decoding apparatus according to claim 37, wherein the decoding means switches the probability table with reference to positions of EOBs in the processing results in the adjacent block located on a left side of the block and the adjacent block located thereon.

39. The image decoding apparatus according to claim 31, wherein the decoding means switches the probability table with reference to a quantization parameter for use in quantizing the plurality of orthogonal transform coefficients.

40. The image decoding apparatus according to claim 31, wherein the decoding means debinarizes a binarization pattern obtained by performing variable-length decoding for the coded data by inverse arithmetic coding to generate the plurality of orthogonal transform coefficients, and switches the probability table to be applied to a first binary code included in the binarization pattern.

41. An image transmission system, in which an image is divided into blocks of a predetermined size, and the image is transmitted by coded data obtained by coding image data for each of the blocks, the system comprising:
   the image coding apparatus of generating the coded data from the image and outputting the coded data, according to claim 21; and
   an image decoding apparatus of receiving the coded data from the image coding apparatus and restoring the image.

* * * * *